(12) United States Patent
Pan et al.

(10) Patent No.: US 12,282,702 B2
(45) Date of Patent: Apr. 22, 2025

(54) CONTROL DEVICE

(71) Applicant: PRIMAX ELECTRONICS LTD., Taipei (TW)

(72) Inventors: Yung-Tai Pan, Taipei (TW); Chi-Shiu Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 317 days.

(21) Appl. No.: 18/057,767

(22) Filed: Nov. 22, 2022

(65) Prior Publication Data
US 2023/0214172 A1 Jul. 6, 2023

Related U.S. Application Data

(60) Provisional application No. 63/296,279, filed on Jan. 4, 2022.

(51) Int. Cl.
*G06F 3/16* (2006.01)
*H04R 3/02* (2006.01)

(52) U.S. Cl.
CPC .............. *G06F 3/165* (2013.01); *H04R 3/02* (2013.01); *H04R 2420/01* (2013.01); *H04R 2430/01* (2013.01)

(58) Field of Classification Search
CPC ....... G06F 3/165; H04R 3/02; H04R 2420/01; H04R 2430/01
See application file for complete search history.

(56) References Cited

U.S. PATENT DOCUMENTS

| | | | | |
|---|---|---|---|---|
| 5,949,886 A | * | 9/1999 | Nevins | H03G 3/32 381/104 |
| 5,949,887 A | * | 9/1999 | Fado | G06F 3/165 715/708 |
| 7,243,068 B2 | * | 7/2007 | Barker | G10L 15/01 704/E15.002 |

* cited by examiner

*Primary Examiner* — Joseph Saunders, Jr.
(74) *Attorney, Agent, or Firm* — WPAT, PC

(57) ABSTRACT

A control device is connected with a microphone and a display device. The control device can be used to implement a microphone gain setting process. The control device includes an adjustment knob. When the adjustment knob of the control device is pressed down, the control device starts to implement the microphone gain setting process. At the same time, a message is shown on the display device to prompt that the control device starts to implement the microphone gain setting process and prompt the user to emit a sound to the microphone for a time period. Consequently, the sound is amplified by a signal gain amplifier of the control device. Then, a message is shown on the display device to prompt the user that the microphone gain setting process is completed.

14 Claims, 3 Drawing Sheets

CONTROL DEVICE

CROSS-REFERENCE TO RELATED APPLICATION

This application claims priority to U.S. Provisional Patent Application No. 63/296,279 filed Jan. 4, 2022, the contents of which are incorporated herein by reference.

FIELD OF THE INVENTION

The present invention relates to a control device, and more particularly to a gain control device for controlling the output sound of a microphone.

BACKGROUND OF THE INVENTION

In a conventional microphone sound processing process, an electronic signal is generated by the microphone after the microphone receives the sound. After the electronic signal is amplified, the amplified electronic signal is outputted from a sound player. Consequently, the volume of the outputted sound can be loud and clear enough. In other words, the gain processing result will directly affect the final volume of the sound that is outputted from the microphone.

Conventionally, the gain setting process and the volume adjustment process of the microphone are individually implemented. That is, the microphone comprises a standalone gain adjustment knob for implementing the gain setting process and a standalone volume adjustment knob for implementing the volume adjustment process. When the user intends to adjust the microphone gain and the sound volume, the user has to operate both of the gain adjustment knob and the volume adjustment knob. Consequently, the gain value of the gain setting process and the sound volume of the volume adjustment process can be adjusted to an optimized combined effect.

However, the gain setting process and the volume adjustment process of the microphone are very complicated. In addition, the settings of different microphones are possibly different. In other words, it is difficult for the user to carry out associated settings.

SUMMARY OF THE INVENTION

For solving the drawbacks of the conventional technologies, the present invention provides a control device. The control device is connected with a microphone and a display device. The control device includes an adjustment knob. The control device can be selectively operated in a normal working mode or a microphone gain setting mode. Moreover, it is easy to switch the operation mode of the control device between these two modes. When the microphone gain setting mode of the control device is enabled, a microphone gain setting process is implemented. Consequently, the electric signal from the microphone is amplified.

The control device can automatically set the microphone gain value. In addition, the microphone gain value can be automatically set as the optimal gain value for adjusting the optimal sound volume. Through the control device, the current setting state and the setting steps can be shown on the display device to prompt the user of the current setting conditions and operating progress. Consequently, the user can operate the control device more easily.

In accordance with an aspect of the present invention, a control device is provided. The control device is connected with a microphone and a display device. The control device includes a main body and an adjustment knob. The adjustment knob is included in the main body. The control device is selectively operated in a normal working mode or a microphone gain setting mode. When the microphone gain setting mode of the control device is enabled, the control device implements a microphone gain setting process. When the microphone gain setting process is implemented, the adjustment knob is triggered to enable the microphone gain setting mode of the control device, a first message is shown on the display to prompt a user that the microphone gain setting process is started, and a second message is shown on the display device to prompt the user to emit a first sound to the microphone. After the microphone receives the first sound, a first electric signal is generated. After the control device receives and analyzes the first electric signal, a microphone gain value is set by the control device, and the first electric signal is amplified by the control device according to the microphone gain value. After the microphone gain setting process of the control device is completed, a third message is shown on the display device to prompt the user, and the microphone gain value is stored in the control device. The control device generates an output sound signal according to the microphone gain value.

In an embodiment, the adjustment knob is selectively operated in a pressing mode or a rotating mode. When the adjustment knob is pressed down, the microphone gain setting mode of the control device is enabled.

In an embodiment, when the adjustment knob is rotated, a volume of the output sound signal is adjustable.

In an embodiment, the control device includes a signal gain amplifier, and the signal gain amplifier is included in the main body. The first electric signal is amplified into a second electric signal by the signal gain amplifier according to the microphone gain value.

In an embodiment, the microphone gain value is in a range between 1 and 1000.

In an embodiment, the microphone gain value is in a range between 100 and 500.

In an embodiment, the control device includes an attenuator, and the attenuator is included in the main body. The second electric signal is attenuated into a third electric signal by the attenuator according to the microphone gain value.

In an embodiment, the attenuation value is in a range between 0% and 100%.

In an embodiment, the control device further includes an analog-to-digital signal converter, and the analog-to-digital signal converter is included in the main bod. The third electric signal is converted into a fourth electric signal by the analog-to-digital signal converter. The fourth electric signal is a digital signal.

In an embodiment, the control device further includes an audio digital signal processor, and the audio digital signal processor is included in the main body. The fourth electric signal is processed into the output sound signal by the audio digital signal processor.

In an embodiment, the control device further includes a first microprocessor, and the first microprocessor is electrically connected with the audio digital signal processor. The output sound signal is processed by the first microprocessor.

In an embodiment, the control device further includes a prompt lamp, and the prompt lamp is included in the main body. In the microphone gain setting process of the control device, if the first sound emitted to the microphone by the user is too loud, the prompt lamp lights up.

In an embodiment, when the control device in in the normal working mode, the control device generates the output sound signal according to the microphone gain value stored in the control device.

In an embodiment, the control device further includes a second microprocessor, and the second microprocessor is included in the main body. When the adjustment knob is triggered, the microphone gain setting mode of the control device is enabled under control of the second microprocessor.

In an embodiment, when the first electric signal is received by the control device, a setting message and a sound prompt bar are shown on the display device.

In an embodiment, the sound prompt bar has an optimal level indicator.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
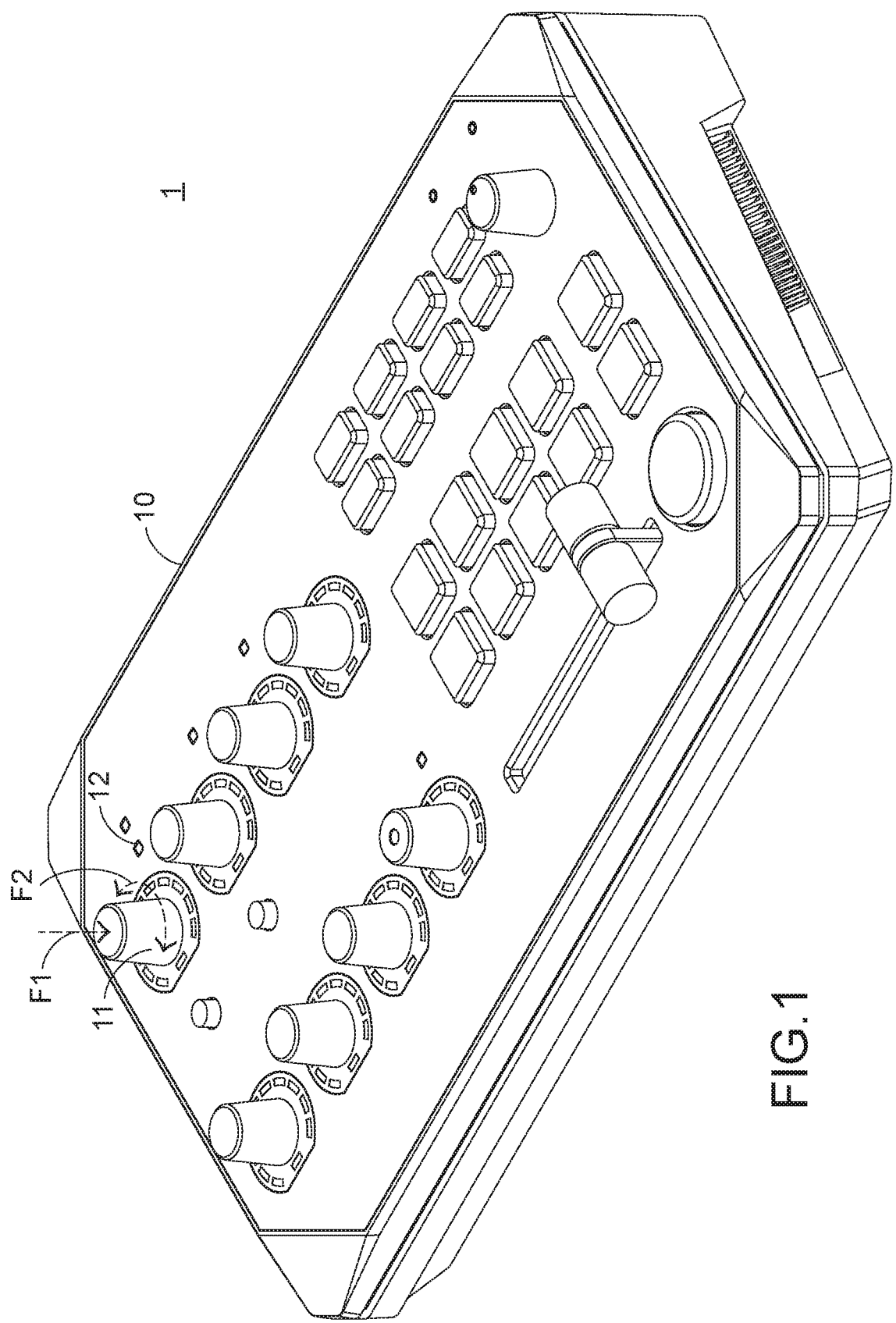
FIG. 1 is a schematic perspective view illustrating a control device according to an embodiment of the present invention.
Figure 2:
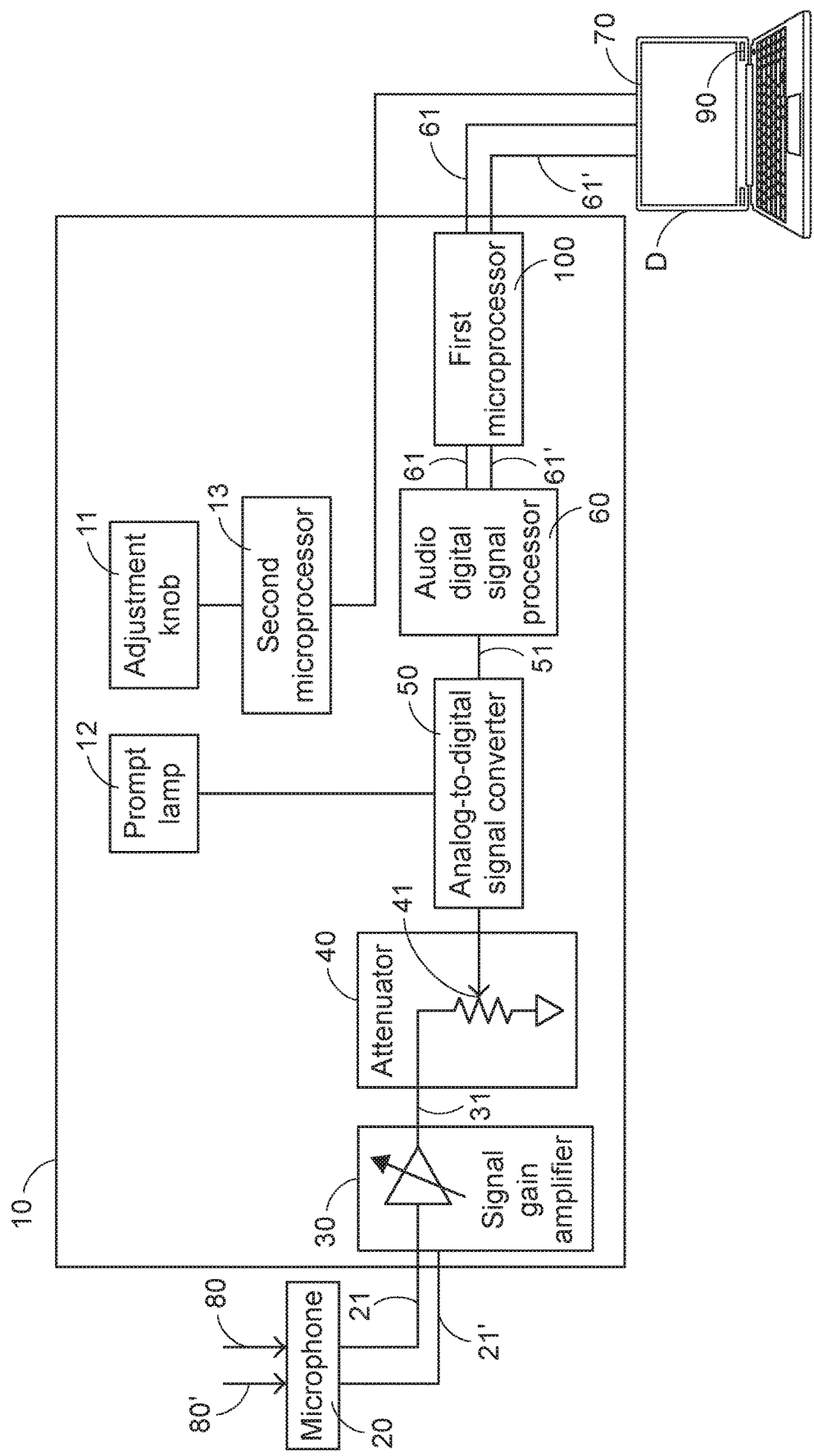
FIG. 2 is a schematic functional block diagram illustrating a signal processing system for the control device according to the embodiment of the present invention.

FIG. 1 is a schematic perspective view illustrating a control device according to an embodiment of the present invention. FIG. 2 is a schematic functional block diagram illustrating a signal processing system for the control device according to the embodiment of the present invention. The control device 1 of the present invention is electrically connected with a microphone 20 and a display device D. The microphone 20 is user to receive the user's sound or the ambient sound and convert the user's sound or the ambient sound into an electric signal. The display device D is an audio and video monitor or a display device of any other appropriate electronic device (e.g., a monitor of a notebook computer or a display screen of a tablet computer).

In an embodiment, the control device 1 comprises a main body 10, an adjustment knob 11, a prompt lamp 12 and a second microprocessor 13. The adjustment knob 11, the prompt lamp 12 and the second microprocessor 13 are included in the main body 10. The control device 1 can be selectively operated in a normal working mode or a microphone gain setting mode. Moreover, the operation mode of the control device 1 can be switched between the normal working mode and the microphone gain setting mode by the user. The adjustment knob 11 can be operated in a pressing mode F1 or a rotating mode F2. In other words, the adjustment knob 11 can be selectively pressed down or rotated. When the adjustment knob 11 is pressed down, the operation mode of the control device 1 is switched under control of the second microprocessor 13, and the microphone gain setting mode of the control device 1 is enabled. Under this circumstance, the control device 1 can implement a microphone gain setting process. After the microphone gain setting process is completed, the operation mode of the control device 1 is restored to the normal working mode automatically. When the control device 1 is operated in the normal working mode, the microphone gain setting mode of the control device 1 is disabled. However, the task of processing the sound from the microphone and the task of controlling the sound volume are performed according to the setting results of the previous microphone gain setting process. When the adjustment knob 11 is rotated, the sound volume is controlled and adjusted accordingly, and the microphone gain setting process is not triggered.

In an embodiment, the control device 1 comprises a signal gain amplifier 30, an attenuator 40, an analog-to-digital signal converter 50, an audio digital signal processor 60 and a first microprocessor 100. These components are included in the main body 10 and electrically connected with each other. In this embodiment, a notebook computer is taken as an example of the display device D. The display device D is electrically connected with the main body 10 of the control device 1. The display device D comprises a user interface 70 and a sound player 90. In some other embodiments, the sound player 90 is an external device that is not connected with the display device D. The microphone 20 is electrically connected with the main body 10 of the control device 1.

Figure 3A:
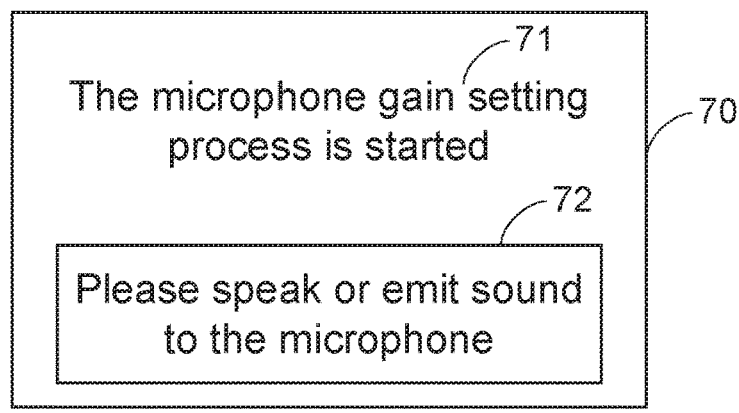
FIG. 3A schematically illustrates a first message and a second message shown on the display device when a microphone gain setting process is started.
Figure 3B:
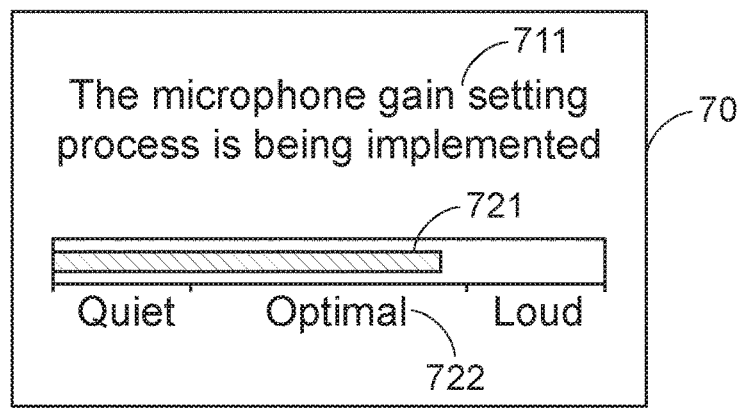
FIG. 3B schematically illustrates a setting message shown on the display device when the microphone gain setting process is being implemented.
Figure 3C:
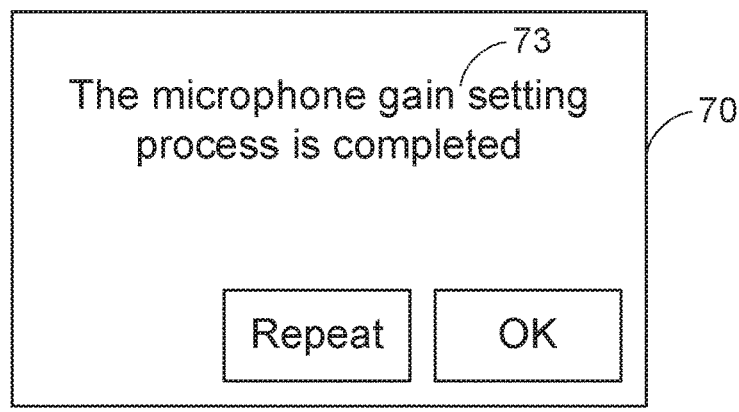
FIG. 3C schematically illustrates a third message shown on the display device after the microphone gain setting process is completed.

Please refer to FIG. 2 and FIGS. 3A, 3B and 3C. FIG. 3A schematically illustrates a first message and a second message shown on the display device when a microphone gain setting process is started. FIG. 3B schematically illustrates a setting message shown on the display device when the microphone gain setting process is being implemented. FIG. 3C schematically illustrates a third message shown on the display device after the microphone gain setting process is completed.

When the adjustment knob 11 is pressed down by the user, the microphone gain setting mode of the control device 1 is enabled. Meanwhile, a first message 71 (see FIG. 3A) is shown on the user interface 70 of the display device D to prompt the user that the control device 1 starts to implement the microphone gain setting process. In addition, a second message 72 (see FIG. 3A) is shown on the user interface 70 of the display device D to prompt the user to emit a first sound 80 to the microphone 20 for a time period.

After the first sound 80 is received by the microphone 20, the microphone 20 generates a first electric signal 21. When the first electric signal 21 is received by the control device 1, a setting message 711 (see FIG. 3B) is shown on the user interface 70 of the display device D to prompt the user that the microphone gain setting process is being implemented. In addition, a sound prompt bar 721 (see FIG. 3B) is shown on the user interface 70.

The first sound 80 emitted to the microphone 20 by the user is directly related to the intensity of the first electric signal 21 that is generated by the microphone 20. In case that the first sound 80 is louder, the intensity of the first electric signal 21 is stronger. Whereas, in case that the first sound 80 is quieter, the intensity of the first electric signal 21 is weaker. The control device 1 receives and analyzes the intensity of the first electric signal 21. In addition, the control device 1 judges whether the intensity of the first electric signal 21 reaches an optimal processable value and whether the stable output is achieved. In the microphone gain setting process, if the first sound 80 emitted to the microphone 20 by the user is too loud, the control device 1 receives and analyzes the intensity of the first electric signal 21 and judges that the intensity of the first electric signal 21 is too strong. Under this circumstance, the prompt lamp 12 of the control device 1 will light up to prompt the user to reduce the sound volume from the microphone 20. At the same time, the sound prompt bar 721 is shown on the user interface 70 of the display device D. The sound prompt bar 721 has an optimal level indicator 722 to prompt the user whether the intensity of the first electric signal 21 generated in response to the first sound 80 reaches the optimal processable value and the stable output is maintained. If the intensity of the first electric signal 21 reaches the optimal processable value and the stable output is achieved, it is feasible to implement the microphone gain setting process continuously.

If the sound prompt bar 721 on the user interface 70 is maintained in the position of the optimal level indicator 722 when the control device 1 receives and analyzes the intensity of the first electric signal 21, it mean that the intensity of the first electric signal 21 is maintained in the optimal level. Consequently, a microphone gain value is set by the control device 1. According to the microphone gain value, the first electric signal 21 is amplified into a second electric signal 31 by the signal gain amplifier 30. The microphone gain value is in the range between 1 and 1000, and preferably in the range between 100 and 500.

For example, if the microphone gain value is set as 100 by the control device 1 after the intensity of the first electric signal 21 is analyzed, the first electric signal 21 is amplified into the second electric signal 31 at 100× magnification by the signal gain amplifier 30 according to the set microphone gain value (i.e., 100). At the same time, a third message 73 is shown on the user interface 70 of the display device D to prompt the user that the microphone gain setting process of the control device 1 is competed. As shown in FIG. 3C, a "Repeat" option and an "OK" option are also displayed on the user interface 70 of the display device D. If the setting result of the microphone gain setting process is accepted by the user, the user may click the "OK" option to end the microphone gain setting process. On the other hand, if the setting result of the microphone gain setting process is not accepted, the user may click the "Repeat" option. Consequently, the microphone gain setting process is repeatedly done.

Furthermore, the microphone gain value is stored in the control device 1. According to the microphone gain value generates an output sound signal 61.

Please refer to FIG. 2 again. After the first electric signal 21 is amplified into the second electric signal 31 by the signal gain amplifier 30 according to the microphone gain value, the second electric signal 31 is attenuated into a third electric signal 41 by the attenuator 40 of the control device 1 according to an attenuation value. The attenuator 40 is used to attenuate the electric signal. In case that the intensity of the attenuated electric signal is weaker, the generated sound volume is lower. For example, the attenuation value is in the range between 0% and 100%. In case that the attenuation value is 0%, it means that the electric signal is not attenuated. Since the intensity of the amplified electric signal is maintained, the output sound signal corresponding to the electric signal has the maximum sound volume. In case that the attenuation value is 100%, it means that the electric signal is attenuated to zero. Since the intensity of the amplified electric signal is attenuated to zero, the sound volume of the output sound signal corresponding to the electric signal is zero. In an embodiment, the default attenuation value in the control device 1 is 20%. After the second electric signal 31 is attenuated at the attenuation value of 20% by the attenuator 40, the intensity of the attenuated second electric signal 31 is reduced to 80% of the intensity of the original second electric signal 31. That is, the intensity of the third electric signal 41 is 80% of the intensity of the second electric signal 31. Consequently, the output sound signal corresponding to the third electric signal 41 is about 80% of the maximum sound volume.

After the second electric signal 31 is attenuated into the third electric signal 41 by the attenuator 40, the third electric signal 41 is received by the analog-to-digital signal converter 50. Consequently, the third electric signal 41 is converted into a fourth electric signal 51 by the analog-to-digital signal converter 50. The fourth electric signal 51 is a digital signal. The audio digital signal processor 60 can receive and process digital signals. In other words, the audio digital signal processor 60 can receive and process the fourth electric signal 51. After the fourth electric signal 51 is processed by the audio digital signal processor 60, the output sound signal 61 is generated. The first microprocessor 100 is electrically connected with the audio digital signal processor 60. In addition, the output sound signal 61 from the audio digital signal processor 60 is processed by the first microprocessor 100. The first microprocessor 100 can convert the signal format of the output sound signal 61. After the signal format of the output sound signal 61 is converted into the compatible signal format of the sound player 90, the output sound signal 61 can be outputted successfully.

When the adjustment knob 11 is rotated, the attenuation value is correspondingly adjusted. In other words, the rotation of the adjustment knob 11 can control the sound volume.

The output sound signal 61 can be received by the sound player 90 of the display device D or any other appropriate electronic device (e.g., an audio device or a speaker). Meanwhile, the amplified sound can be played by the sound player 90, the audio device or the speaker. Furthermore, the sound volume can be adjusted by the user.

When the control device 1 is operated in the normal working mode, the microphone gain setting process is not implemented. However, the sound from the microphone 20 is processed according to the microphone gain value obtained in the previous microphone gain setting process. That is, when the control device 1 is operated in the normal working mode, the microphone gain setting process is not implemented. However, the sound from the microphone 20 is processed according to the microphone gain value obtained in the previous microphone gain setting process. That is, when the control device 1 is operated in the normal working mode, the user emits a second sound 80' to the microphone 20. After the second sound 80' is received by the microphone 20, the microphone 20 generates the corresponding first electric signal 21'. According to the microphone gain value obtained in the previous microphone gain setting process, the first electric signal 21' is amplified. Consequently, the corresponding output sound signal 61' is generated. After the output sound signal 61' is converted and processed by the first microprocessor 100, the processed output sound signal 61' are transmitted to the sound player 90, the audio device or the speaker for playback.

From the above descriptions, the present invention provides the control device 1. By operating the adjustment knob 11 of the control device 1, the functions of the microphone gain setting process and the sound volume adjustment can be achieved. The operation of the control device 1 is very simple. In addition, the gain value of the microphone gain setting process and the sound volume of the volume adjustment process can be adjusted to an optimized combined effect.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A control device connected with a microphone and a display device, the control device comprising:
   a main body; and
   an adjustment knob included in the main body, wherein the adjustment knob is selectively operated in a pressing mode or a rotating mode;
   wherein the control device is selectively operated in a normal working mode or a microphone gain setting mode,
   wherein the microphone gain setting mode of the control device is enabled when the adjustment knob is pressed down, and when the microphone gain setting mode of the control device is enabled, the control device implements a microphone gain setting process,
   wherein when the microphone gain setting process is implemented, the adjustment knob is triggered to enable the microphone gain setting mode of the control device, a first message is shown on the display to prompt a user that the microphone gain setting process is started, and a second message is shown on the display device to prompt the user to emit a first sound to the microphone, wherein after the microphone receives the first sound, a first electric signal is generated, wherein after the control device receives and analyzes the first electric signal, a microphone gain value is set by the control device, and the first electric signal is amplified by the control device according to the microphone gain value,
   wherein after the microphone gain setting process of the control device is completed, a third message is shown on the display device to prompt the user, and the microphone gain value is stored in the control device,
   wherein the control device generates an output sound signal according to the microphone gain value.

2. The control device according to claim 1, wherein when the adjustment knob is rotated, a volume of the output sound signal is adjustable.

3. The control device according to claim 1, wherein the control device comprises a signal gain amplifier, and the signal gain amplifier is included in the main body, wherein the first electric signal is amplified into a second electric signal by the signal gain amplifier according to the microphone gain value.

4. The control device according to claim 3, wherein the control device comprises an attenuator, and the attenuator is included in the main body, wherein the second electric signal is attenuated into a third electric signal by the attenuator according to the microphone gain value.

5. The control device according to claim 4, wherein the attenuation value is in a range between 0% and 100%.

6. The control device according to claim 4, wherein the control device further comprises an analog-to-digital signal converter, and the analog-to-digital signal converter is included in the main body, wherein the third electric signal is converted into a fourth electric signal by the analog-to-digital signal converter, and the fourth electric signal is a digital signal.

7. The control device according to claim 6, wherein the control device further comprises an audio digital signal processor, and the audio digital signal processor is included in the main body, wherein the fourth electric signal is processed into the output sound signal by the audio digital signal processor.

8. The control device according to claim 7, wherein the control device further comprises a first microprocessor, and the first microprocessor is electrically connected with the audio digital signal processor, wherein the output sound signal is processed by the first microprocessor.

9. The control device according to claim 1, wherein the control device further comprises a prompt lamp, and the prompt lamp is included in the main body.

10. The control device according to claim 1, wherein when the control device in the normal working mode, the control device generates the output sound signal according to the microphone gain value stored in the control device.

11. The control device according to claim 1, wherein the control device further comprises a second microprocessor, and the second microprocessor is included in the main body, wherein when the adjustment knob is triggered, the microphone gain setting mode of the control device is enabled under control of the second microprocessor.

12. The control device according to claim 1, wherein when the first electric signal is received by the control device, a setting message and a sound prompt bar are shown on the display device.

13. The control device according to claim 12, wherein the sound prompt bar has an optimal level indicator.

14. A control device connected with a microphone and a display device, the control device comprising:
   a main body;
   an attenuator included in the main body; and
   an adjustment knob included in the main body;
   wherein the control device is selectively operated in a normal working mode or a microphone gain setting mode,
   wherein when the microphone gain setting mode of the control device is enabled, the control device implements a microphone gain setting process,
   wherein when the microphone gain setting process is implemented, the adjustment knob is triggered to enable the microphone gain setting mode of the control device, a first message is shown on the display to prompt a user that the microphone gain setting process is started, and a second message is shown on the display device to prompt the user to emit a first sound to the microphone, wherein after the microphone receives the first sound, a first electric signal is generated, wherein after the control device receives and analyzes the first electric signal, a microphone gain value is set by the control device, and the first electric signal is amplified by the control device according to the microphone gain value,
   wherein after the microphone gain setting process of the control device is completed, a third message is shown on the display device to prompt the user, and the microphone gain value is stored in the control device, wherein the control device generates an output sound signal according to the microphone gain value;

wherein the control device comprises a signal gain amplifier, and the signal gain amplifier is included in the main body, wherein the first electric signal is amplified into a second electric signal by the signal gain amplifier according to the microphone gain value; and wherein the second electric signal is attenuated into a third electric signal by the attenuator according to the microphone gain value.

* * * * *